(12) United States Patent
Nelissen et al.

(10) Patent No.: US 8,644,847 B1
(45) Date of Patent: *Feb. 4, 2014

(54) PROVIDING GEOGRAPHIC LOCATION INFORMATION ON A TELEPHONE DEVICE

(75) Inventors: Marco Nelissen, San Jose, CA (US); Thomas J. Tuttle, West Roxbury, MA (US)

(73) Assignee: Google Inc., Mountain View, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/249,127

(22) Filed: Sep. 29, 2011

Related U.S. Application Data

(63) Continuation of application No. 12/943,505, filed on Nov. 10, 2010.

(51) Int. Cl.
*H04M 3/42* (2006.01)
*H04W 24/00* (2009.01)

(52) U.S. Cl.
USPC .............. 455/456.1; 455/456.3; 455/456.6; 455/415

(58) Field of Classification Search
USPC .......... 455/414.1, 457, 456.1–456.6, 415
See application file for complete search history.

(56) References Cited

U.S. PATENT DOCUMENTS

| | | | |
|---|---|---|---|
| 6,721,406 B1 * | 4/2004 | Contractor | 379/142.06 |
| 7,353,034 B2 * | 4/2008 | Haney | 455/457 |
| 7,840,226 B1 | 11/2010 | Walsh et al. | |
| 7,933,609 B2 * | 4/2011 | Lagerstedt et al. | 455/456.1 |
| 8,000,726 B2 * | 8/2011 | Altman et al. | 455/456.3 |
| 8,081,992 B2 * | 12/2011 | Book | 455/457 |
| 2003/0013461 A1 * | 1/2003 | Mizune et al. | 455/456 |
| 2006/0034441 A1 | 2/2006 | Kraft | |
| 2006/0052116 A1 | 3/2006 | Bhogal et al. | |
| 2007/0116220 A1 | 5/2007 | Eckel et al. | |
| 2008/0090592 A1 * | 4/2008 | Tsuchiya | 455/456.6 |
| 2008/0198989 A1 | 8/2008 | Contractor | |
| 2009/0005023 A1 | 1/2009 | Toorn | |
| 2009/0181699 A1 * | 7/2009 | Tysowski | 455/457 |
| 2010/0317368 A1 * | 12/2010 | Augst et al. | 455/456.1 |
| 2011/0182414 A1 * | 7/2011 | Hemant et al. | 379/142.06 |
| 2011/0201356 A1 * | 8/2011 | George | 455/456.2 |

OTHER PUBLICATIONS

'Apple Updates MobileMe, Adds iPhone Locator App' [online] PCMag, 2010, [retrieved on Nov. 9, 2011]. Retrieved from the internet: <URL: http://www.pcmag.com/article2/0,2817,2365259,00.asp#fbid=ZR_Ewj1xJmD>. 3 pages.

(Continued)

*Primary Examiner* — Vladimir Magloire
*Assistant Examiner* — Michael S Bush
(74) *Attorney, Agent, or Firm* — Fish & Richardson P.C.

(57) ABSTRACT

In one implementation, a computer-implemented method includes receiving, from a first telephone device and at a second telephone device, a request to accept a telephone call. The method further includes obtaining information that indicates a first current geographic location of the first telephone device or the associated first user based on the second telephone device or an associated second user being a member of a group of call recipients that are permitted to receive the information that indicates the first current geographic location. The method additionally includes, using the obtained information, providing a representation of the first current geographic location of the first telephone device on the second telephone device in association with the telephone call from the first telephone device.

20 Claims, 7 Drawing Sheets

(56) References Cited

OTHER PUBLICATIONS

'AT&T FamilyMap' [online]. AT&T, 2011, [retrieved on Nov. 9, 2011]. Retrieved from the internet: <URL: https://familymap.wireless.att.com/finder-att-family/welecome.htm>. 1 page.

'Computer-Aided Dispatch Software Resources' [online]. Dispatch Magazine On-line, 2011, [retrieved on Nov. 9, 2011]. Retrieved from the internet: <URL: http://www.911dispatch.com/info/cad/index.html>. 9 pages.

'Enhanced 9-1-1' [online]. Wikipedia—The Free Encyclopedia, 2011, [retrieved on Nov. 9, 2011]. Retrieved from the internet: <URL: http://en.wikipedia.org/wiki/Enhanced_911>. 10 pages.

'Family Locator' [online]. Verizon Wireless, 2011, [retrieved on Nov. 9, 2011]. Retrieved from the internet: https://products.verizonwireless.com/index.aspx?id=fnd_familylocator. 2 pages.

'Low Cost GPS Tracking Service for Everyone' [online]. AccuTracking, Eyes at Your Fingertips, 2004-2011, [retrieved on Nov. 9, 2011]. Retrieved from the internet: <URL: https://secure.accutracking.com/>. 2 pages.

'Protect Your Mobile Device, Enterprise Class Security Point-n-click Simplicity' [online]. Mobile Defense, 2011, [retrieved on Nov. 9, 2011]. Retrieved from the internet: <URL: http://www.mobiledefense.com/>. 2 pages.

'Sprint Family Locator' [online]. Sprint, 2011, [retrieved on Nov. 9, 2011]. Retrieved from the internet: <URL: https://sfl.sprintpcs.com/finder-sprint-family/signIn.htm>. 1 page.

'The Many Interfaces of CAD' [online]. Dispatch Magazine On-line, 2011, [retrieved on Nov. 9, 2011]. Retrieved from the internet: <URL: http://www.911dispatch.com/info/cad/cadscreen.html>. 1 page.

* cited by examiner

PROVIDING GEOGRAPHIC LOCATION INFORMATION ON A TELEPHONE DEVICE

CROSS-REFERENCE TO RELATED APPLICATIONS

This application is a continuation of and claims priority under 35 U.S.C. §120 to U.S. application Ser. No. 12/943,505, filed on Nov. 10, 2010, the entire contents of which are hereby incorporated by reference.

TECHNICAL FIELD

This document generally describes methods, systems, techniques, and computer program products for providing geographic location information on a telephone device.

BACKGROUND

Telephone devices (e.g., mobile telephones, smart phones, landline telephones, etc.) have been configured to display caller identity ("call ID") information for incoming calls. For example, if Alice calls Bob from a telephone device associated with the telephone number (123) 456-7890, Bob's telephone device can display Alice's telephone number ((123) 456-7890) and/or her name in association with the incoming telephone call.

A variety of techniques can be used to transmit caller identity information to a call recipient, such as frequency shift keying (FSK). FSK permits for bits of data to be transmitted to a telephone device as part of a telephone call. For example, a first tone (e.g., 1,200 Hertz) can represent a one, and a second tone (e.g., 2,200 Hertz) can represent a zero. Call ID information can be transmitted to a telephone device receiving a telephone call through a series of tones that, when interpreted using a caller identity transmission protocol (e.g., ASCII encoding, particular data packet size and fields, etc.), indicate a caller's identity (e.g., telephone number, name, etc.).

SUMMARY

This document describes techniques for providing information regarding a caller telephone device's current geographic location on a telephone device (e.g., mobile telephone, smart phone, cell phone, etc.) of a callee (a party to whom the caller is/has placed a telephone call). For example, if Alice is located in Denver, Colo., when she places a telephone call to Bob using her mobile telephone device, information regarding Alice's current geographic location (Denver, Colo.) can be provided on Bob's telephone device in conjunction with Alice's call. For instance, Bob's telephone device can display a message that says "Incoming call from Alice; Current Geo. Location for Alice—Denver, Colo."

The techniques described in this document can allow for callers to share their current geographic location to selected particular callees, so as to protect the privacy of the callers. For example, a caller can designate callees who are permitted to receive the caller's current geographic location, such as by assigning particular callees in the caller's contact list to a group. A caller may designate such a group based on any of a variety of pre-defined groups of users for the caller, such as a list of telephone contacts and users designated as acquaintances (e.g., friends) on a social network. For instance, Alice may designate that a callee that is included in the list of telephone contacts on her mobile telephone device is permitted to receive information regarding her current geographic location.

In one implementation, a computer-implemented method includes receiving, from a first telephone device and at a second telephone device, a request to accept a telephone call. The method further includes obtaining information that indicates a first current geographic location of the first telephone device or the associated first user based on the second telephone device or an associated second user being a member of a group of call recipients that are permitted to receive the information that indicates the first current geographic location. The method additionally includes, using the obtained information, providing a representation of the first current geographic location of the first telephone device on the second telephone device in association with the telephone call from the first telephone device.

In another implementation, a computer-implemented method includes receiving, at a first mobile telephone device, a request from a first user of the first mobile telephone device to initiate a telephone call with a second mobile telephone device. The method further includes determining whether the second mobile telephone device or a second user associated with the second mobile device is a member of a group of call recipients that are permitted to receive a first current geographic location associated with the first mobile telephone device. The method additionally includes, in response to determining that the second mobile telephone device or the second user is a member of the group, providing information that indicates the first current geographic location to the second mobile telephone device over a network.

In a further implementation, a system for providing information that indicates a current geographic location in association with a telephone call includes a first mobile telephone device that is associated with a first user and a second mobile telephone device that is associated with a second user. The system further includes a server system that is in communication with the first mobile telephone device and the second mobile telephone device over one or more networks, and a geographic location tracking module of the server system that is configured to maintain information that indicates a current geographic location associated with the first mobile telephone device or the first user. The system additionally includes a geographic permission module of the server system that is configured to determine whether the second mobile telephone device or the second user is permitted to receive the current geographic location associated with the first mobile telephone device or the first user. The system also includes a network interface of the server system that is configured to provide information that indicates the current geographic location over the one or more networks to the second mobile telephone device based on the determination made by the geographic permission module.

The details of one or more embodiments are set forth in the accompanying drawings and the description below. Various advantages can be provided. For example, a user of a telephone device can make more informed and better decisions regarding how to handle an incoming call request based on the current geographic location of the caller. For instance, if a user receives a call request from a friend who lives thousands of miles away, but the call request indicates that the friend is calling from a geographic location that is only a couple blocks from the user's current location, then the user may be more likely to make time to answer his/her friend's call request—the user may infer that the friend is in town and is calling to meet up. Without the geographic location information, the user may not have been able to make such an informed decision.

In another example, providing an approximate geographic location of an incoming call from a caller on a mobile telephone device can allow a user to screen calls (e.g., unwanted telephone calls from solicitors) with a greater degree of certainty. For instance, a mobile telephone device can display a map and/or geographic location information (e.g., city, state, country, etc.) for a caller telephone device based on information indicating at least an approximate geographic location for the caller telephone device, such as an area code for the caller telephone device. A user may be able to more readily determine whether to screen a caller based on geographic locations than based on area codes. For instance, a user may be able to more readily remember geographic locations where his/her friends live than area codes associated with such locations.

Users can additionally protect their privacy by maintaining control over who is able to receive their current geographic location information. A user can designate one or more groups of call recipients that are permitted to receive his/her current geographic location information in association with a telephone call request. Additionally, a user can be notified when his/her geographic location is being provided to an intended call recipient and can be provided with an opportunity to stop the telephone device from providing the geographic location information to the call recipient.

Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
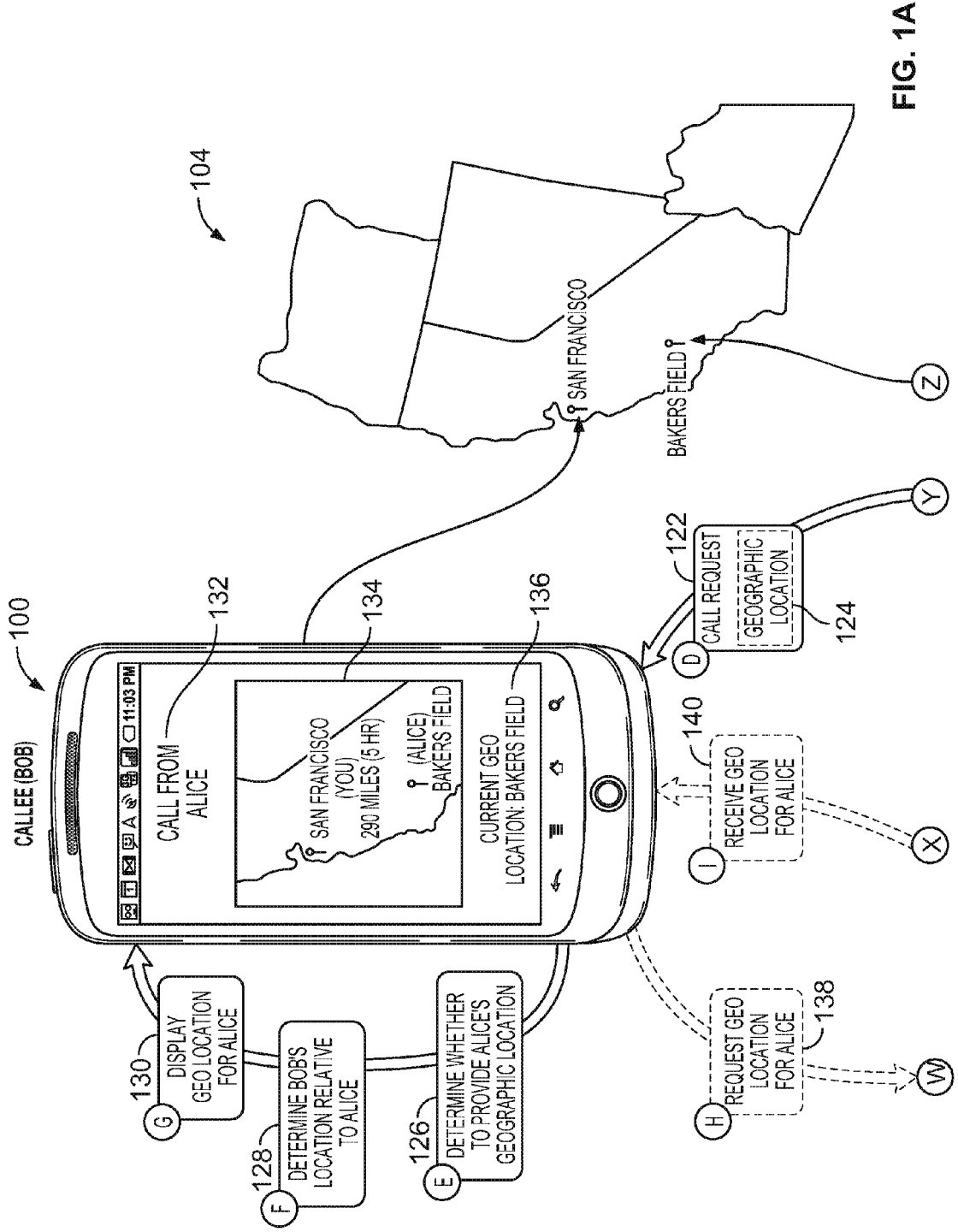
FIGS. 1A-B depict a conceptual diagram of an example callee telephone device that provides current geographic location information for a caller telephone device.

This document describes methods, systems, techniques, and computer program products for providing geographic location information (e.g., map depicting a current geographic location, name of a city/state/country, etc.) on a telephone device (e.g., a mobile telephone, a smart phone, a landline telephone, a voice over internet protocol (VOIP) telephone, etc.). Geographic location information can be provided in association with a telephone call. For instance, information regarding a current geographic location of a caller telephone device can be provided on a callee telephone device (e.g., displayed, audibly transmitted) in association with a telephone call from the caller telephone device to the callee telephone device (e.g., display a message stating "Incoming telephone call; From: John Doe; Current geographic location of caller: Denver, Colo.").

A telephone call recipient (a callee) can use information regarding a caller's geographic location to decide how to respond to a call request from the caller. For example, assume that Alice lives in Chicago, Ill. and Bob lives in San Francisco, Calif. When Bob receives a telephone call from Alice and information regarding Alice's geographic location indicates that Alice is currently located in Chicago (e.g., message displayed on Bob's telephone device stating "Incoming telephone call from Alice; Current location for Alice: Chicago, Ill."), Bob may expect that Alice is calling to catch-up. Bob may decide whether or not to answer the call based on whether he is currently available to have a potentially lengthy telephone call with Alice.

In contrast, if information regarding Alice's current geographic location indicates that Alice is located in San Francisco (e.g., message displayed on Bob's telephone device stating "Incoming telephone call from Alice; Current location: San Francisco, Calif."), Bob may assume that Alice is calling because she is currently in town and would like to meet up with Bob. Bob may respond to such a telephone call request differently than a telephone call request that indicates that Alice is located in Chicago. For example, when Alice's telephone call indicates that she is located in San Francisco, Bob may figure that Alice's telephone call is time-sensitive (e.g., Alice may be in San Francisco for a short period of time) and decide to answer Alice's telephone call regardless of his current availability. In contrast, when Alice's telephone call indicates that she is located in Chicago, Bob may figure that talking to Alice is not time-sensitive (e.g., Bob could catch-up with Alice at a later date) and decide he will call Alice back later when he has some free time.

A caller can control whether a callee receives geographic location information associated with the caller. For example, out of privacy concerns, a caller may want to share his/her current geographic location with only his/her friends. The caller can configure his/her telephone device to restrict the availability of information regarding his/her current geographic location to callees that are members of a group of approved callees (e.g., callees included in the caller's telephone contact list, callees that are friends of the caller on a social network, etc.). For instance, when Alice places a telephone call to Bob, Alice's telephone device can check whether Bob is designated as an "approved" contact in Alice's telephone contact list before making Alice's current geographic location available to Bob in conjunction with the telephone call.

A callee can additionally control whether geographic location information is provided in conjunction with a telephone call. Before displaying information regarding a caller's current geographic location, a callee telephone device can check whether the callee is a member of a group of approved callers (e.g., callers included in the callee's telephone contact list, callers that are friends of the callee on a social network, etc.) for whom current geographic location information is of interest to the callee. For instance, Bob is likely to be interested in the current geographic location of Alice, who would be a member of the approved group of callers for Bob, but may not be interested in the current geographic location of a telemarketer, who would likely not be a member of Bob's approved group of callers.

Figure 1B:
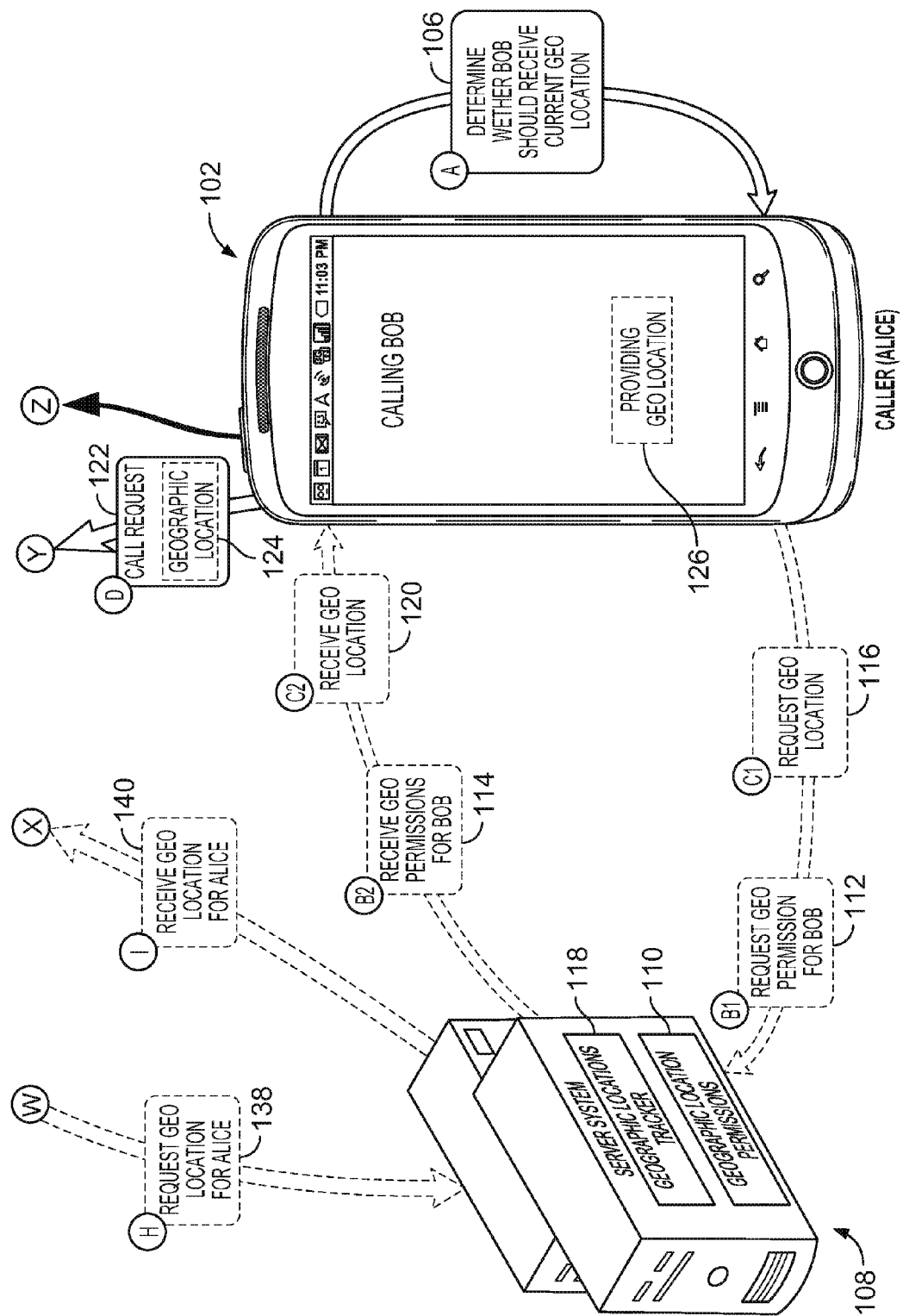

Information regarding a caller's current geographic location can be obtained by a caller in conjunction with a telephone call in a variety of ways. For example, a caller can transmit information regarding his/her current geographic location to a callee with a telephone call request (e.g., using FSK, through a short message service (SMS) text sent to the callee in conjunction with the call). In another example, with the caller's permission, a server system (e.g., cell phone service provider system, social network system, etc.) can track the caller's current geographic location and, in response to receiving a call request from the caller, the callee can query the server system for the caller's current geographic location. In such an example, the server system can maintain information regarding callees that are permitted to receive information regarding the caller's current geographic location. In a further example, in response to receiving a call request from a caller, a callee can query a social network FIGS. 1A-B depict a conceptual diagram of an example callee telephone device 100 that provides current geographic location information for a caller telephone device 102. As depicted in the example, a user Bob is associated with the callee telephone device 100 and a user Alice is associated with the caller telephone device 102. As show in the map 104, the caller telephone device 102 is currently located in Bakersfield, Calif., and the callee telephone device 100 is currently located in San Francisco, Calif.

Referring to FIG. 1B, Alice provides input to the caller telephone device 102 that instructs the caller telephone device 102 to initiate a telephone call to the callee telephone device 100 that is associated with Bob. For example, Alice selects an entry for Bob from a telephone contact list provided on a display of the caller telephone device 102. In response to receiving the input, the caller telephone device 102 determines whether Bob should receive current geographic location information for the caller telephone device 102 and/or Alice, as indicated by step A (106). The caller telephone device 102 can make such a determination in a variety of ways. For example, the caller telephone device 102 can check whether Bob and/or the callee telephone device 100 associated with Bob are members of a group of call recipients that are pre-approved by Alice to receive information regarding her current geographic location. Such a group of pre-approved call recipients can based on a variety of sources, such as a telephone contact list, designated groups of entries within a telephone contact list (e.g., entries designated as "favorites," "friends," "family," etc.), and/or acquaintances on a social network (e.g., users designated as friends on social network).

For instance, Alice can configure the group of pre-approved call recipients to include her telephone contacts that are designated as "friends" or "favorites," her friends on a social network (e.g., FACEBOOK, TWITTER, etc.), and other individually designated users/telephone devices. If Bob and/or the callee telephone device 100 are included in this group of pre-approved call recipients, then the caller telephone device 100 can proceed with providing information regarding the current geographic location for Alice and/or the caller telephone device 102.

The caller telephone device 102 can perform step A (106) based, at least in part, on interactions with a remote server system 108 that includes a geographic location permissions module 110. In conjunction with information stored locally on the caller telephone device 102, the geographic location permissions module 110 of the remote server system 108 can maintain information regarding call recipients and/or telephone devices that are pre-approved to receive information regarding Alice's geographic location. For example, the remote server system 108 can be a mobile telephone server system that stores a white list of telephone numbers that, per Alice's designation, are permitted to receive geographic location associated with Alice. In another example, the remote server system 108 can be a social network server system that stores information regarding acquaintances of Alice, such as information (e.g., social network username) identifying friends, family, co-workers, and business contacts. Interaction with the remote server system 108 can allow for Alice to detach geographic location permissions from the caller telephone device 102 so that Alice can use the permissions across multiple different devices, such as on a laptop computer with a VOIP client.

In some implementations, the caller telephone device 102 provides a request 112 to the remote server system 108 an indication of whether Bob and/or the callee telephone device 100 are permitted to receive information regarding Alice's geographic location, as indicated by step B1. The caller telephone device 102 can include some sort of identifier for Bob and/or the callee telephone device 100, such as a telephone number for the callee telephone device 100, a social network username for Bob, and an email address for Bob. The request 112 can be transmitted from the caller telephone device 102 to the remote server system 108 over any of a variety of communication networks, such as a cellular network, a public switched telephone network (PSTN), the Internet, a 3G/4G data network, or any combination thereof. The request 112 can also include information identifying Alice and/or the caller telephone device 102, such as the telephone number for the caller telephone device 102, a social network username for Alice, and/or an email address for Alice.

Using the information included in the request 112, the geographic location permissions module 110 of the remote server system 108 can retrieve a group of users and/or telephone devices that are permitted to receive information indicating a current geographic location for Alice and/or the caller telephone device 102. From the retrieved information, the geographic location permissions module 110 determines whether Bob and/or the callee telephone device 100 are members of the group (are permitted to receive the geographic location information for Alice). There may be conditions associated with such permissions that the geographic location permissions module 110 considers as well when making such a determination. For example, Alice may specify that Bob is permitted to receive information regarding her current geographic location during business hours on weekdays.

The remote server system 108 can then transmit information (e.g., a Boolean value, text, etc.) indicating whether Bob and/or the callee telephone device 100 are permitted to receive current geographic location information back to the caller telephone device 102, as indicated by step B2 (114).

For the purpose of this example, Bob and/or the callee telephone device 100 are determined at step A 106 (and possibly in conjunction with the server system 108 and steps B1 and B2) to be pre-approved to receive information regarding Alice's current geographic location. In response to such a determination, the caller telephone device 102 can obtain information regarding the current geographic location for Alice and/or the caller telephone device 102, such as longitude and latitude coordinates corresponding to the current geographic location (e.g., global positioning system (GPS) coordinates), a name corresponding to the current geographic location (e.g., "Bakersfield, Calif."), an address corresponding to the current geographic location (e.g., "100 Main Street, Bakersfield, Calif."), and information identifying a nearby landmark (e.g., "located near the mall in Bakersfield, Calif.").

Information regarding the current geographic location of the caller telephone device 102 and/or Alice can be determined locally by the caller telephone device 102 and/or remotely through interaction with a remote server system, such as the remote server system 108. The caller telephone device 102 can determine its current geographic location using a variety of sensors, such as a GPS sensor. The caller telephone device 102 can also determine its current geographic location based on user input, such as Alice updating her status on a social network to including information regarding her current geographic location (e.g., updating her status to be "visiting family in Bakersfield, Calif.").

The caller telephone device 102 can also obtain information regarding its current geographic location by providing a request 116 for such information to the server system 108, as indicated by step C1. The server system 108 can include a geographic location tracker 118 that can determine the current geographic location of the caller telephone device 102. For example, the geographic location tracker 118 can be a module on a mobile telephone server system that is configured to triangulate the location of the caller telephone device 102 through the signal strength of the caller telephone device 102 over a network, such as a cellular network and/or a data network (e.g., 3G/4G network). In another example, the geographic location tracker 118 can be a "location check-in" service on provided on a social network by social network server systems, where users earn rewards/points for travelling to and logging their presence at particular geographic locations. The server system 108 can transmit information regarding the current geographic location of the caller telephone device 102 and/or Alice to the caller telephone device 102, as indicated by the step C2 (120).

Having determined that Bob and/or the callee telephone device 100 can receive geographic location information for Alice and/or the caller telephone device 102, and obtained geographic location information, the caller telephone device 102 can initiate a telephone call with the callee telephone device 100 and, in conjunction with the call initiation, provide the geographic location information to the callee telephone device 100. As indicated by step D, the caller telephone device 102 can cause a call request 122 to be transmitted over a network (e.g., PSTN, Internet, local area network (LAN), wide area network (WAN), 3G/4G data network, VOIP network, etc.) to the callee telephone device 100. The call request 122 can include geographic location information 124 (e.g., GPS coordinates, zip code, street address, etc.). For example, the geographic location information 124 can be transmitted to the callee telephone device 100 using FSK, similar to the technique for providing caller id information indicated above. The geographic location information 124 can also be provided separate from the call request 122 over a back-channel data connection between the caller telephone device 102 and the callee telephone device 100, such as through a data connection between the two devices.

The caller telephone device 102 can provide information to Alice indicating that geographic location information is being provided to Bob and the callee telephone device 100. For example, the caller telephone device 102 displays a message 126 "Calling Bob; Providing Geo Location." Although not depicted, such a message can also provide Alice with an opportunity to cancel providing geographic location information to Bob and the callee telephone device 100, so that Alice can maintain control over her privacy. Additionally, in some implementations, Alice can be queried before transmitting the call request 122 by the caller telephone device 102 as to whether she wants to provide Bob with information regarding her current geographic location. In such implementations, the geographic location information 124 can be provided to the callee telephone device 100 in response to an affirmative answer from Alice.

Referring to FIG. 1A, upon receiving the call request 122 and the geographic location information 124, the callee telephone device 100 can determine whether to display the geographic location information 124 for Alice in conjunction with the call request 122, as indicated by step E (126), and/or how to display the geographic location information 124 on the callee telephone device 100, as indicated by steps F and G (128 and 130, respectively). For example, Bob may only be interested in seeing the current geographic location information for his friends and family. If a call is received from someone other than a person and/or telephone number identified as being one of Bob's friends or family members, the callee telephone device 100 can ignore the received geographic location information 124. In another example, Bob may configure the callee telephone device 100 to display the current geographic location for all callers (when provided to or made available to the callee telephone device 100), regardless of whether they are known to Bob or not (e.g., a solicitor)—Bob may want to know the location of all callers before answering a telephone call. In the present example, the callee telephone device 100 identifies that Alice is a member of a group of callers whose current geographic location Bob is interested in and proceeds to determine how to display Alice's current geographic location.

In step F (128) the callee telephone device 100 determines its and/or Bob's current geographic location. Such a determination can be made locally by the callee telephone device and/or through interaction with a remote system, similar to the description provided above with regard to the caller telephone device 102. The current geographic location of the callee telephone device 100 (and/or Bob) can be compared to the current geographic location information 124 for the caller telephone device 102 (and/or Alice) to determine a level of zoom or detail to use for presenting the current geographic location information 124 on the callee telephone device 100.

For example, if Alice is calling from London, England and Bob is located in San Francisco, providing Alice's current street address and a map of her location zoomed into London would likely not be useful to Bob. Based on the large distance between Bob in San Francisco and Alice in England, the callee telephone device 100 can determine that less detail regarding Alice's location would likely be useful to Bob, such as providing her location as "England" or "Europe." In contrast, if Alice were calling from one mile away from Bob's current location in San Francisco, providing Alice's current street address as well as map detailing the two locations and a distance between them might be useful to Bob.

At step G (130), the callee telephone device 100 can display the geographic location information 124 for the caller telephone device 102 (and/or Alice) on a display of the callee telephone device 100. The information 124 can be displayed/provided in a variety of formats, such as text, as a map, and audio output. In the example presented, the callee telephone device 100 displays text 132 indicating that the call is from Alice, a map 134 that indicates the current geographic locations of Alice and Bob (as well as a distance, route, and estimated driving time between the two locations), and text 136 indicating that Alice is currently located in Bakersfield.

In some implementations, the callee telephone device 100 may not receive geographic location information 124 from the caller telephone device 102 in conjunction with the call request 122. For example, the interaction of the callee and caller telephone devices 100-102 can be configured so that the callee telephone device 100 requests such information from a remote server system, such as the server system 108, instead of receiving the information directly from the caller telephone device 102. In another example, the specific caller telephone device 102 may not be configured to provide the geographic location information 124 (e.g., the caller telephone device 102 may be outdated and unable to provide such information). In such implementations, the callee telephone device 100 can request geographic location information for Alice and/or the caller telephone device 102 from a remote server system (such as the server system 108) that is configured a) to determine whether Bob is permitted to receive information regarding Alice's current geographic location and b) to obtain this information.

As indicated by step H (138) the callee telephone device 100 can request geographic location information for Alice and/or the caller telephone device 102 from the server system 108. Such a request can include information identifying both Alice/caller telephone device 102 and Bob/callee telephone device 100 so that the server system 108 can determine whether Bob is permitted to receive Alice's geographic location information. The server system 108 can use the geographic location permissions module 110 described above to make such a determination. As indicated earlier, the geographic location permissions module 110 can make such a determination based on permissions provided by Alice—even though the determination can be made remote from the caller telephone device 102, Alice can maintain control over who receives information regarding her current geographic location.

Based on the determination by the geographic location permission module 110, the server system 108 can then determine Alice's current geographic location using the geographic locations tracker 118, as described above. With Bob/callee telephone device 100 verified and Alice's current geographic location determined, the server system 108 can provide the geographic location information to the callee telephone device 100, as indicated by step I (140).

The callee telephone device 100 can further be configured to provide geographic location information for Alice in conjunction with the call request 122 when the geographic location information 124 is not available (not received from the caller telephone device 102 or able to be obtained from the server system 108) based on a location associated with the telephone number for the caller telephone device 102. For example, if the caller telephone device 102 has the telephone number (612) 123-4567, the callee telephone device 100 can determine that the caller telephone device 102 is associated with Minneapolis, Minn. based on the area code 612. In such scenarios when the geographic location information is not available, a variety of geographic associations with telephone numbers can be used, such as country codes, area codes, and local codes.

Figure 2:
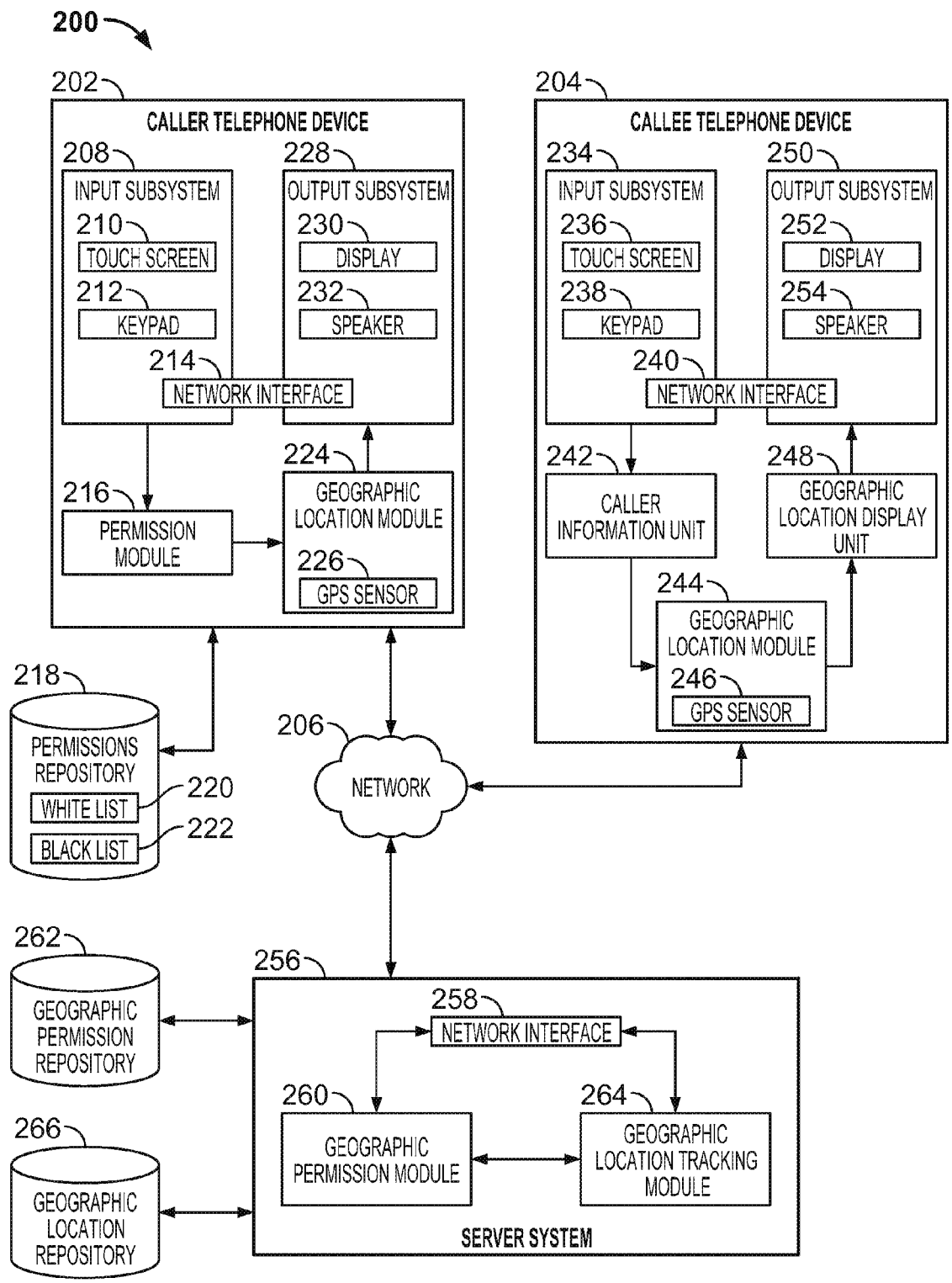
FIG. 2 is a diagram of an example system for providing information that indicates a current geographic location in association with a telephone call.

FIG. 2 is a diagram of an example system 200 for providing information that indicates a current geographic location in association with a telephone call. The system 200 is depicted as including a caller telephone device 202 that is configured to provide geographic location information to a callee telephone device 204 in conjunction with a telephone call between the two devices over a network 206, similar to the caller telephone device 102 and the callee telephone device 100 described above with regard to FIG. 1.

The caller and callee telephone devices 202 and 204, respectively, can be any variety of telephone devices, such as a smartphone, a mobile telephone, a VOIP telephone (including a traditional non-telephone computing device, such as a laptop computer, that is running a VOIP application to place and receive telephone calls), a satellite telephone, and a landline telephone. The network 206 can be any variety of communications networks, such as a cellular telephone network, a 3G/4G data network, a wireless network, a BLUETOOTH network, the Internet, a LAN, a WAN, a fiber-optic network, a PSTN, or any combination thereof.

The caller telephone device 202 and the callee telephone device 204 are described below as having various modules, units, and subsystems, some of which are described with regard to one of the devices and not the other. The caller telephone device 202 can function as the callee telephone device 204, and vice versa. As such, the caller telephone device 202 can include the modules, units, and subsystems described with regard to the callee telephone device 204, and the caller telephone device 204 can include the modules, units, and subsystems described with regard to the caller telephone device 202.

The caller telephone device 202 includes an input subsystem 208 that is configured to receive a variety of input, such as user input and network-based input. The input subsystem 208 is depicted as including a touchscreen 210 and a keypad 212, through which user input can be received by the caller telephone device 202. For example, a user of the caller telephone device 202 can provide input instructing the caller telephone device 202 to initiate a telephone call to the callee telephone device 204 using the touchscreen 210 and/or the keypad 212. The input subsystem 208 is depicted as also including a network interface 214 that is configured to send and receive information over the network 206. The network interface can include a variety of interfaces, such as a wireless network interface and a cellular network interface. The caller telephone device 202 can include other input devices not depicted.

Input received through the input subsystem 208 indicating a request to initiate a telephone call to the callee telephone device 204 can be provided to the permission module 216. The permission module 216 is configured to determine whether the intended recipient of the telephone call is permitted to receive information regarding a current geographic location of the caller telephone device 202 (and/or a user of the caller telephone device 202). The permission module 216 can make such a determination in a manner similar to the technique described above with regard to step A (106) with regard to the caller telephone device 102. The permission module 216 can make such a determination based on information stored in a permissions repository 218. The permission repository 218 can store information indicating call recipients (users and/or telephone devices) that are permitted to receive the current geographic location information, such as a whitelist 220, and/or information indicating call recipients that are not permitted to receive such geographic location information, such as a blacklist 222. The whitelist 220 and the blacklist 222 can be based on a variety of pre-existing groups, such as a telephone contact list, groups identified in a telephone contact list, and/or acquaintances on a social network.

The permission module 216 can instruct a geographic location module 224 to obtain information regarding the caller telephone device's current geographic location in response to determining that the intended call recipient is permitted to receive such information. The geographic location module 224 can include a variety of sensors to determine the geographic location of the caller telephone device 202, such as a GPS sensor 226. The geographic location module 224 provides information (e.g., GPS coordinates, street address, zip code, etc.) regarding a current geographic location of the caller telephone device 202 to an output subsystem 228 for transmission in conjunction with the call request to the callee telephone device 204. As described above with regard to the caller telephone device 102, the output subsystem 228 can transmit this geographic location information as part of the telephone call request to the callee telephone device 204 (e.g., transmitted as data using FSK) and/or over a back-channel data connection (e.g., transmission over 3G/4G data network).

The output subsystem 228 can include a variety of components to provide output to a user of the caller telephone device 202, such as a display 230 and a speaker 232. For example, when the caller telephone device 202 has determined that the intended call recipient is permitted to receive geographic location information, the user of the caller telephone device 202 can be alerted to such a determination by providing a message (e.g., "providing current geographic location to call recipient") on the display 230 and/or through the speaker 232. the output subsystem 228 is depicted as also including the network interface 214, through which the telephone call to the callee telephone device 204 can be initiated.

The callee telephone device 204 is depicted as including an input subsystem 234 that is similar to the input subsystem 208 of the caller telephone device 202. The input subsystem 234 includes a touchscreen 236, a keypad 238, and a network interface 240, similar to the touchscreen 210, keypad 212, and the network interface 214. The callee telephone device 204 can receive the telephone call request from the caller telephone device 202 through the network 206 and using the network interface 240 of the input subsystem 234.

The received telephone call request can be provided to the caller information unit 242 of the callee telephone device 202. The caller information unit 242 is configured to determine whether geographic location information for the caller is included in the call request and, if so, to interpret such information. For instance, the current geographic location information can be encoded using FSK and any of a variety of protocols (e.g., predefined fields for providing geographic location information). The caller information unit 242 can interpret such encoded information.

Additionally, the caller information unit 242 can determine whether a user of the callee telephone device 204 has indicated whether he/she is interested in having the current geographic location information for the caller telephone device 202 provided in conjunction with the call request. For example, the user of the callee telephone device 204 may only be interested in current geographic location information for unknown callers (e.g., solicitors) and for known callers (e.g., callers on the telephone contact list) within a threshold distance of the callee telephone device's current geographic location (e.g., within 1, 5, 10, 50, 100 miles).

If the caller information unit 242 has determined that the caller's current geographic location information is to be provided in conjunction with the received call request, then the caller information unit 242 can prompt a geographic location module 244 with a GPS sensor 246 to determine a current geographic location for the callee telephone device 204. The geographic location module 244 can provide the determined current geographic location for the callee telephone device 204 to a geographic location display unit 248 that is configured to determine how to display the current geographic location for the caller telephone device 202. Similar to the techniques described above with regard to the callee telephone device 100 and the steps F and G (128 and 130, respectively), the geographic location display unit 248 can base the manner of displaying the current geographic location information for the caller telephone device 202 (e.g., level of zoom, amount of detail, etc.) on a comparison with the current geographic location for the callee telephone device 204.

The geographic location display unit 248 can provide the determined manner of displaying the geographic location information (as well as the geographic location information) to an output subsystem 250 of the callee telephone device 204. The output subsystem 250 can provide the geographic location information to a user of the callee telephone device 204 in conjunction with information regarding the call request, such as displaying text and/or a map, and/or providing audio output. Similar to the output subsystem 228, the output subsystem 250 includes a display 252, a speaker 254, and the network interface 240.

The system 200 is also depicted as including a server system 256 that is configured to interact with the caller telephone device 202 and/or the callee telephone device 204 to provide current geographic location information in conjunction with the call request between the two devices. The server system 256 includes a network interface 258 (e.g., wireless network interface, fiber optic network interface, LAN network interface, PSTN interface, cellular network interface, etc.) that is configured to send and receive information through the network 206. The server system 256 is similar to the server system 108 described above with regard to FIG. 1 and can be any of a variety of server systems, such as a mobile telephone server system and/or a social network server system.

Through the network 206 and the network interface 258, the server system 256 can receive requests from the caller telephone device 202 for an indication as to whether an intended call recipient is permitted to receive the caller's current geographic location information and/or information regarding the caller's current geographic location. A geographic permission module 260 (similar to the geographic module 110) can determine whether an intended call recipient is permitted to receive the caller's current geographic location. The geographic permission module 260 can make such a determination using a geographic permission repository 262 that is configured to store information regarding pre-approved (and pre-disapproved) call recipients for various users and/or telephone devices.

The server system 256 also includes a geographic location tracking module 264 (similar to the geographic location tracker 118) that is configured to determine a current geographic location for a telephone device, such as the caller telephone device 202. The geographic location tracking module 264 may make such a determination using a geographic location repository 266 that can maintain a user and/or telephone device's most recent geographic location. For example, the geographic location repository 266 can be used as part of a social network check-in system, where users check-in their current geographic location.

The server system 256 can serve requests from the caller telephone device 202 and the callee telephone device 204 using the geographic permission module 260 and/or the geographic location tracking module 264. For example, the callee telephone device 204 can request current geographic location information for the caller telephone device 202 in response to receiving a call request from the caller telephone device 202. The server system 256 can verify that callee telephone device 204 is permitted to receive such information and can then determine the caller's current geographic location information using the geographic location tracking module 264. In such a scenario, the geographic permission module 260 may additionally verify that the callee telephone device 204 has in fact received a call request from the caller telephone device 202 as part of the permission check, so as to not allow a callee telephone device 204 to receive geographic location information for the caller telephone device 202 outside of a call request.

Figure 3A:
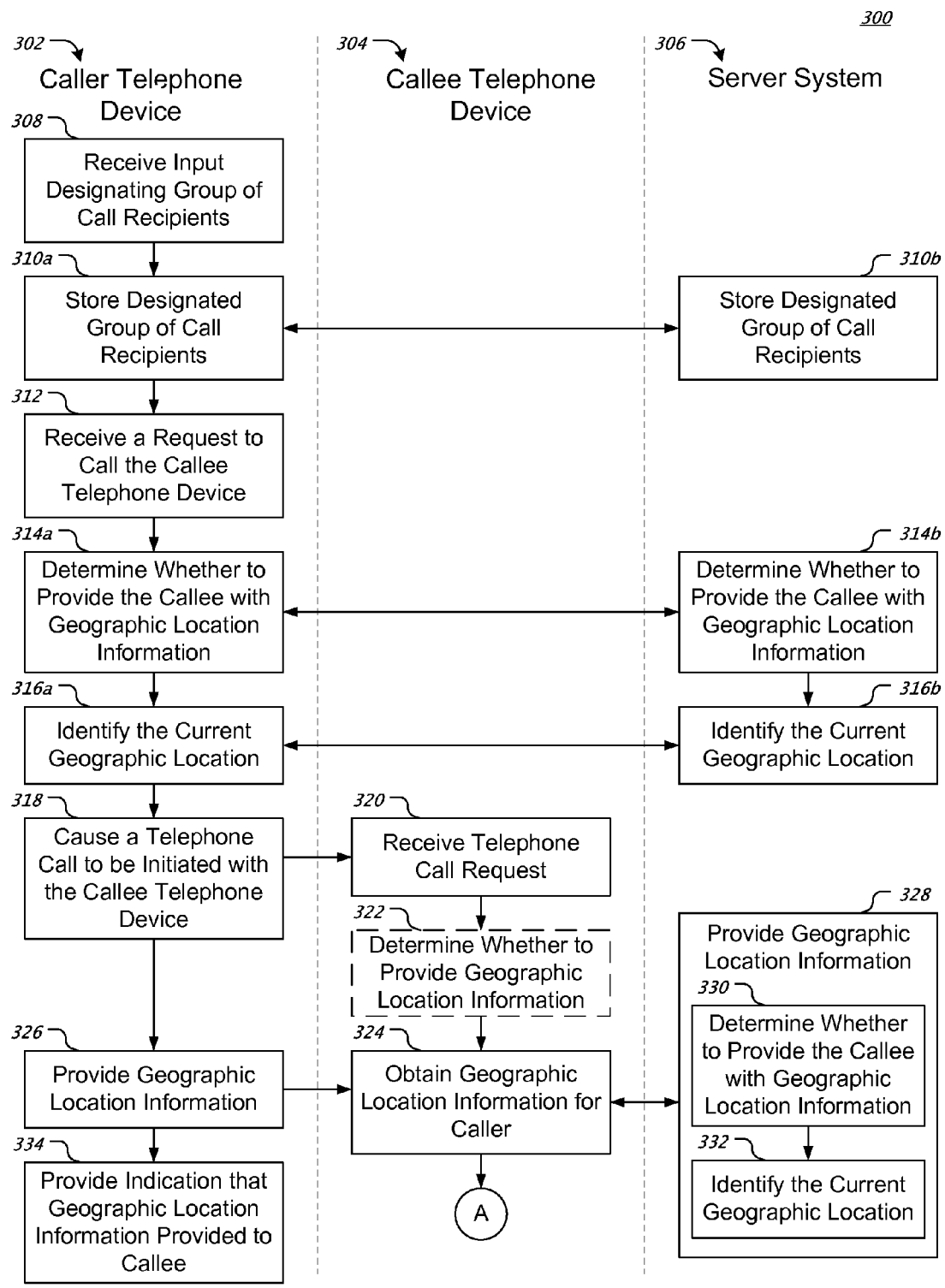
FIGS. 3A-B depict a flowchart showing an example technique for providing information that indicates a current geographic location in association with a telephone call.
Figure 3B:
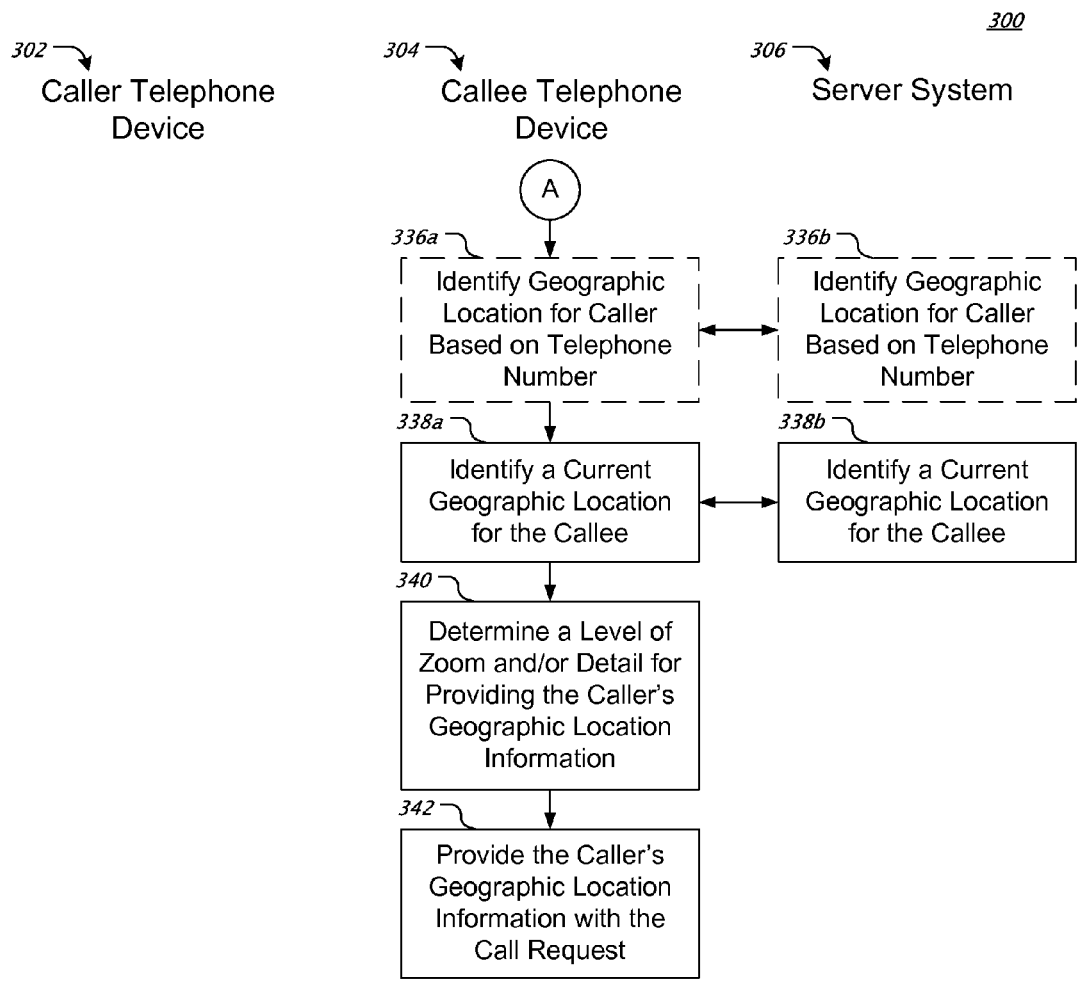

FIGS. 3A-B depict a flowchart showing an example technique 300 for providing information that indicates a current geographic location in association with a telephone call. The technique 300 is depicted as including a variety of steps that are performed by a caller telephone device 302, a callee telephone device 304, and/or a server system 306. In this example, the caller telephone device 302 is configured to provide geographic location information to the callee telephone device 304 in conjunction with a telephone call between the two devices, similar to the caller telephone device 102 and the callee telephone device 100 described above with regard to FIG. 1, and/or the caller telephone device 202 and the callee telephone device 204 described above with regard to FIG. 2. The server system 306 can be any of a variety of server systems configured to assist in providing geographic location information to the callee telephone device 304, similar to the server system 108 described with regard to FIG. 1 and/or the server system 256 described with regard to FIG. 2.

Referring to FIG. 3A, the technique 300 starts at step 308 with the caller telephone device 302 receiving user input designating a group of call recipients that are permitted to receive geographic location information for the caller telephone device 302 and/or a user associated with the caller telephone device 302. For example, Alice can indicate, through a user interface on the caller telephone device 102, that entries designated as "friends" in her telephone contact list are permitted to receive her geographic location information in association with a telephone call request.

At steps 310a-b, the designated group of call recipients is stored by the caller telephone device 302 (step 310a) and/or the server system (step 310b). As indicated above with regard to FIGS. 1 and 2, such information regarding permitted groups of call recipients can be maintained locally on the caller telephone device 302 and/or remotely, such as on the server system 306.

The caller telephone device 302 receives a request to call the callee telephone device 304 (step 312). In response to receiving the call request, the caller telephone device 302 can determine whether to provide the callee telephone device with geographic location information (step 314a). This determination can be made in conjunction with the server system 306 (step 314b). The determination can be made using the stored group of preapproved call recipients and based on an identifier for the callee telephone device 304 (e.g., telephone number, social network username, etc.). For example, the permission module 216 of the caller telephone device 202 and/or the geographic permission module 260 of the server system 256 can determine whether to the callee telephone device 204 is permitted to receive geographic location information for the caller telephone device 202, as described above with regard to FIG. 2.

Based on the determination at steps 314a-b, the caller telephone device 302 and/or the server system 306 can identify the current geographic location for the caller telephone device 302 and/or a user associated with the caller telephone device 302. For example, the geographic location module 224 of the caller telephone device 202 and/or the geographic location tracking module 264 can identify a current geographic location for the caller telephone device 202, as described above with regard to FIG. 2.

At step 318, the caller telephone device 302 can cause a telephone call with the callee telephone device 304 to be initiated. For example, the caller telephone device 202 can transmit a telephone call request over the network 206 to the callee telephone device 204. The callee telephone device 304 receives the telephone call request at step 320.

In some implementations, the callee telephone device 304 determines whether the user of the callee telephone device 304 is interested in having geographic location information for the caller telephone device 302 provided in conjunction with the call request. As described above with regard to step E (126) depicted in FIG. 1, the callee telephone device 100 can determine whether the Bob is interested in the having the current geographic location information for Alice to be displayed with the call request from the caller telephone device 102. Such a determination can be made based upon whether the caller telephone device 302 and/or a user associated with the caller telephone device 302 is a member of a predetermined group of callers whose geographic location the user of the caller telephone device 302 is interested in.

The callee telephone device 304 can obtain geographic location information for the caller telephone device 302 (step 324). Obtaining geographic location information can include receiving geographic location information as provided by the caller telephone device 302 as part of or in conjunction with the call request (step 326).

The geographic location information can also be obtained by the callee telephone device 302 requesting such information from the server system 306 and being provided with the geographic location information for the caller telephone device 302 in return (step 328). In such implementations, the callee telephone device 304 can provide identifying information to the server system 306, such as a telephone number and/or a username, and the server system 306 can determine whether the callee telephone device 304 is permitted to receive the information (step 330, similar to step 314b) and can identify a current geographic location for the caller telephone device 302 (step 332, similar to step 316b). The callee telephone device 304 may request the geographic location information from the server system 306 (step 328) when it has not otherwise received geographic location information from the caller telephone device 302 in association with the call request (step 326).

The caller telephone device 302 can provide an indication that geographic location information is being provided to the callee telephone device 304 (step 334). For example, the caller telephone device 102 displays the message 126 to Alice, alerting her that her geographic location information is being provided to Bob. Such an indication can be include an option for the user to cancel the geographic location information begin provided (e.g., the user can be provided with a short time period (e.g., a few seconds) to cancel before the geographic location information is provided).

Referring to FIG. 3B, in some implementations the callee telephone device 304 and/or the server system 306 can identify a geographic location for the caller telephone device 302 based on a telephone number for the caller telephone device 302 (steps 336a-b). For example, if geographic location information for the caller telephone device 302 is not available (e.g., the caller telephone device 302 is not configured to provide geographic location information) or the callee telephone device is not permitted to receive such information, then the callee telephone device 304 can attempt to identify a geographic location for the caller telephone device 302 based on available location indicators, such as the caller's telephone number. For instance, the caller's telephone number can include geographic identifiers, such as a country code, an area code, and/or a local/city code.

At steps 338a-b, a current geographic location for the callee telephone device 304 can be determined by the callee telephone device 304 (step 338a) and/or the server system 306 (step 338b). The geographic location for the callee telephone device 304 can be used to determine a level of zoom and/or detail to use for providing the caller's geographic location in conjunction with the call request (step 340). For example, the callee telephone device 204 can use the geographic location display unit 248 to make such a determination. Using the determined level of zoom and/or detail, the callee telephone device 304 can provide the caller's geographic location information in association with the call request (step 342). For instance, the callee telephone device 204 can provide such information using any variety of components of the output subsystem 250, such as the display 252 and/or the speaker 254.

Figure 4:
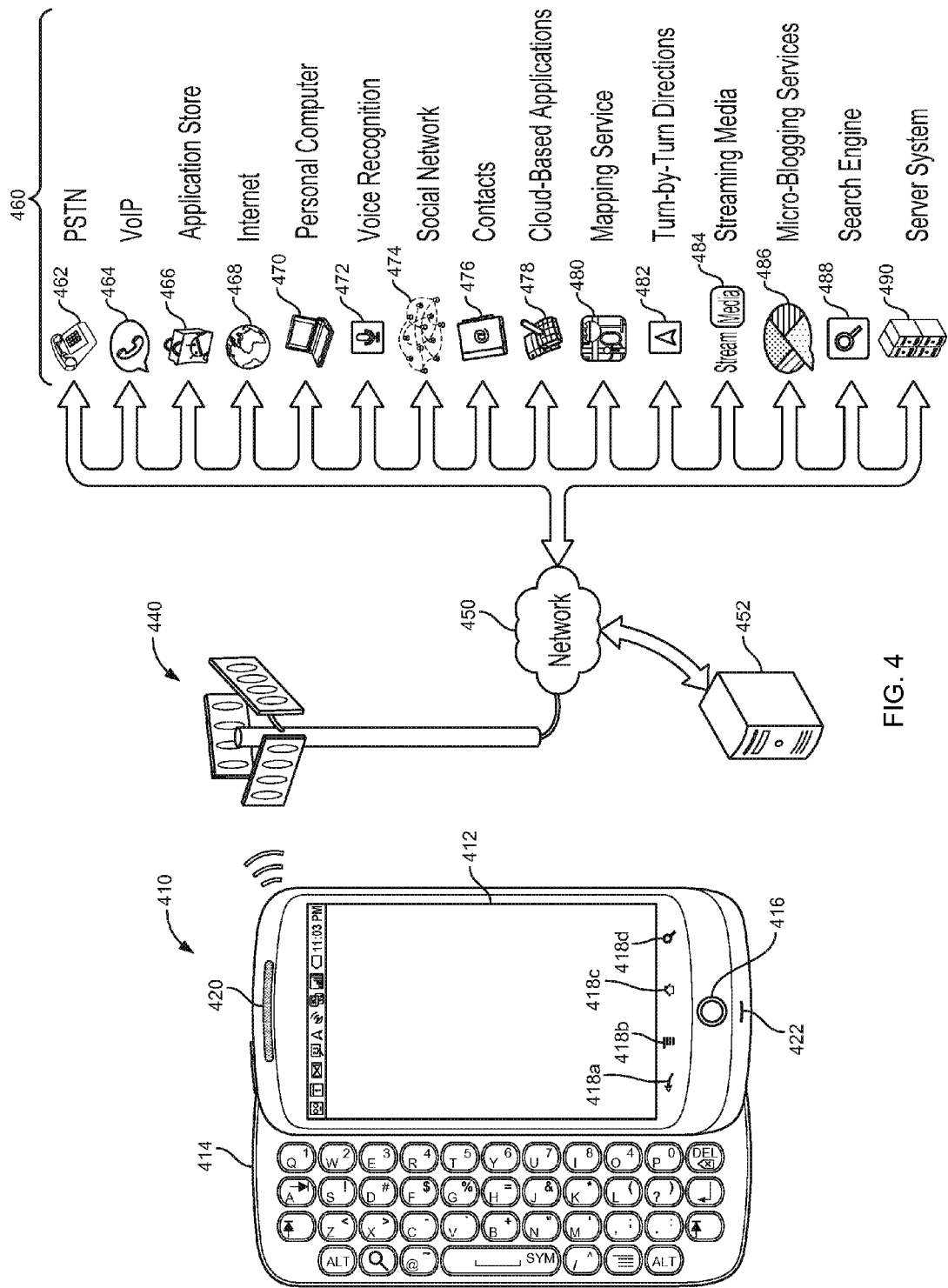
FIG. 4 depicts a conceptual diagram of a system that may be used to implement the systems and methods described in this document is illustrated.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-4', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 5:
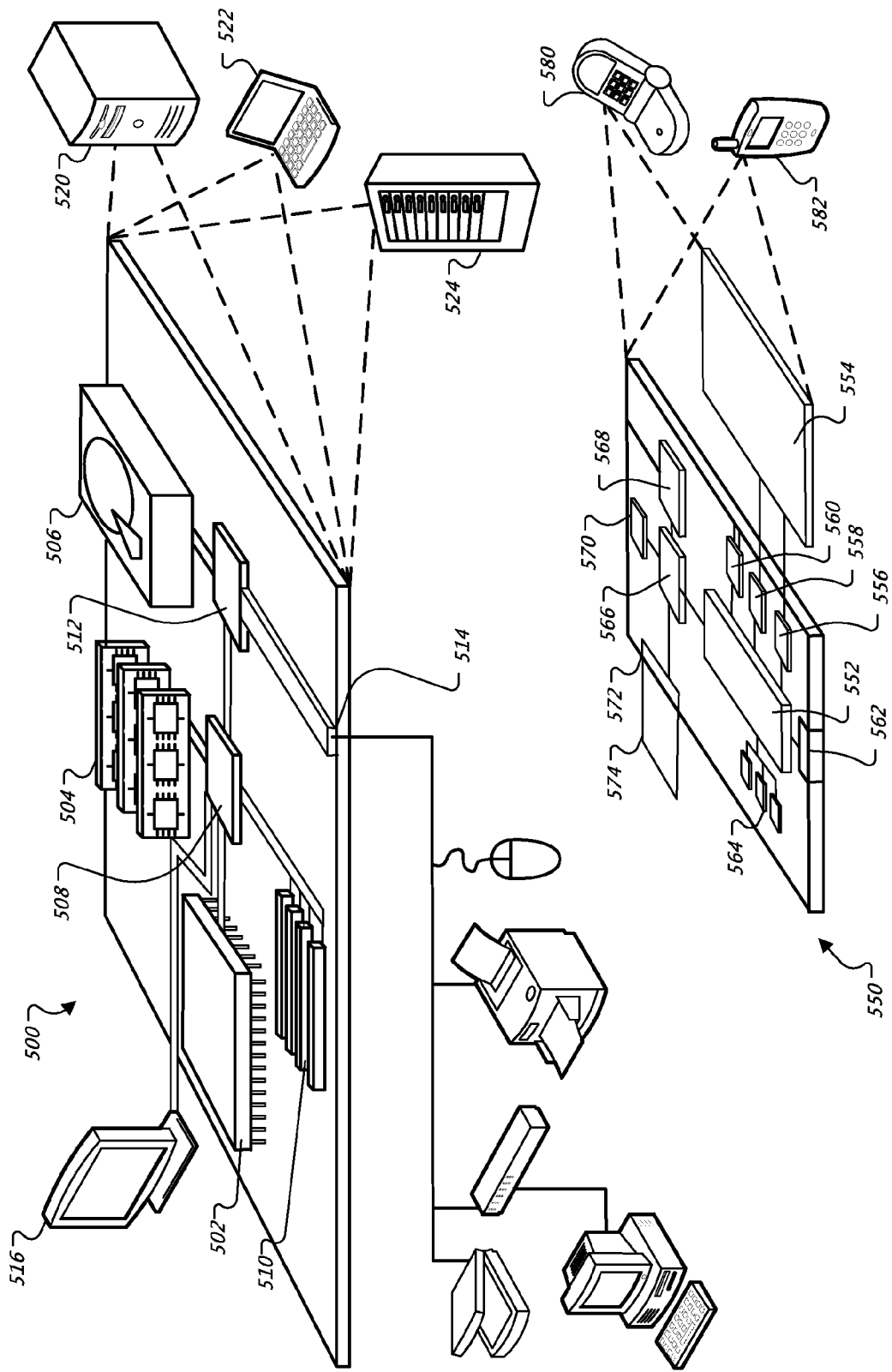
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for providing geographic location information on a telephone device may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
    receiving, from a first telephone device having an associated first user, and at a second telephone device having an associated second user, a telephone call request to accept a telephone call;
    identifying, by the second telephone device and in response to receiving the telephone call request, a social network identifier for the associated first user based on a telephone number for the first telephone device that was received with the telephone call request;
    providing, by the second telephone device, a geographic location request to a server system that is distinct from the first and second telephone devices for information that identifies a current geographic location of the first telephone device or the associated first user, wherein the geographic location request includes the social network identifier for the associated first user, wherein the server system is associated with a social network and is configured to provide location information based on received status updates for users including location-based updates for users of the social network;
    receiving, at the second telephone device, the information that identifies the current geographic location of the first telephone device or the associated first user from the server system, wherein the information was identified based on one or more recent location-based updates that were received in association with the social network and the first user; and
    after receiving the information, using the obtained information to provide a representation of the current geographic location of the first telephone device on the second telephone device in association with the telephone call from the first telephone device.

2. The computer-implemented method of claim 1, wherein providing the representation of the current geographic location of the first telephone device comprises displaying a map that depicts, at least, the current geographic location of the first telephone device on a display of the second telephone device.

3. The computer-implemented method of claim 2, further comprising:
    identifying a current geographic location of the second telephone device or a second user associated with the second telephone device; and
    determining a level of zoom at which to display the map based on a distance between the current geographic location of the first telephone device and the current geographic location of the second telephone device;
    wherein the representation of the current geographic location of the first telephone device is provided on the second telephone device using the determined level of zoom.

4. The computer-implemented method of claim 2, wherein the map is displayed on the display of the second telephone device with information that indicates an identity of the first telephone device or the associated first user and with information that prompts the associated second user to accept the telephone call request.

5. The computer-implemented method of claim 1, wherein
    the geographic location request further includes an identifier for the second telephone device or the second user;
    the information is received by the second telephone device based on the second telephone device or the associated second user being a member of a group of call recipients that are permitted to receive the information that indicates the current geographic location of the first telephone device; and
    the group of call recipients is based on a telephone contact list stored by the second telephone device, or stored remotely in association with the second telephone device or the associated second user.

6. The computer-implemented method of claim 1, wherein
    the geographic location request further includes an identifier for the second telephone device or the second user;
    the information is received by the second telephone device based on the second telephone device or the associated second user being a member of a group of call recipients that are permitted to receive the information that indicates the current geographic location of the first telephone device; and the group of call recipients is based on information that identifies one or more acquaintances of the associated second user on a social network.

7. The computer-implemented method of claim 1, further comprising determining whether the first telephone device or the associated first user is a member of a group of callers for whom the second telephone device is configured to display a geographic location;

wherein the information indicating the current geographic location is obtained in response to determining that the first telephone device or the associated first user is a member of the group of callers.

8. The computer-implemented method of claim 7, further comprising:

in response to determining that the first telephone device or the associated first user is not a member of the group of callers, identifying a geographic location associated with a telephone number from which the telephone call request is received by the second telephone device;

providing a representation of the identified geographic location on the second telephone device in association with the telephone call from the first telephone device.

9. The method of claim 1, wherein the social network identifier for the first user is identified from information that is stored locally on the second telephone device.

10. The method of claim 1, wherein the telephone call request includes information that identifies a telephone number for the first telephone device; and the identifying comprises converting the telephone number into the social network identifier for the associated first user based on the telephone number and a telephone contact list that is stored locally on the second telephone device.

11. A mobile computing device comprising:

an interface to receive, from a telephone device having an associated user, a telephone call request to accept a telephone call;

a caller information unit to:

identify, in response to receiving the telephone call request, a social network identifier for the associated user based on a telephone number for the telephone device that was received with the telephone call request, provide a geographic location request to a server system that is distinct from the mobile computing device and telephone device for information that identifies a current geographic location of the telephone device or the associated user, wherein the geographic location request includes the social network identifier for the associated user, wherein the server system is associated with a social network and is configured to provide location information based on received status updates for users including location-based updates for users of the social network, and receive the information that identifies the current geographic location of the telephone device or the associated user from the server system, wherein the information was identified based on one or more recent location-based updates that were received in association with the social network and the first user; and a display to, after receiving the information, use the obtained information to display a representation of the current geographic location of the telephone device on the mobile computing device in association with the telephone call from the telephone device.

12. The system of claim 11, wherein the social network identifier for the associated user is identified from information that is stored locally on the mobile computing device.

13. The system of claim 11, wherein the display is further configured to display a map that depicts, at least, the current geographic location of the telephone device.

14. The system of claim 13, further comprising:

a geographic location module of the mobile computing device to:

identify a current geographic location of the mobile computing device or a user associated with the mobile computing device; and determine a level of zoom at which to display the map on the display of the mobile computing device based on a distance between the current geographic location of the telephone device and the current geographic location of the mobile computing device;

wherein the representation of the current geographic location of the telephone device is displayed on the display of the mobile computing device using the determined level of zoom.

15. The system of claim 13, wherein the map is displayed on the display of the mobile computing device with i) information that indicates an identity of the telephone device or the associated user and ii) information that prompts a user who is associated with the mobile computing device to accept the telephone call request.

16. A computer program product tangibly embodied on a computer readable storage medium storing instructions that, when executed, cause one or more processors to perform operations comprising:

receiving, from a telephone device having an associated user, a telephone call request to accept a telephone call;

identifying, in response to receiving the telephone call request, a social network identifier for the associated user based on a telephone number for the telephone device that was received with the telephone call request;

providing a geographic location request to a server system for information that identifies a current geographic location of the telephone device or the associated user, wherein the geographic location request includes the social network identifier for the associated user, wherein the server system is associated with a social network and is configured to provide location information based on received status updates for users including location-based updates for users of the social network;

receiving the information that identifies the current geographic location of the telephone device or the associated user from the server system, wherein the information was identified based on one or more recent location-based updates that were received in association with the social network and the first user; and after receiving the information, using the obtained information to provide a representation of the current geographic location of the telephone device in association with the telephone call from the telephone device.

17. The computer program product of claim 16, wherein the social network identifier for the associated user is identified from information that is locally stored and accessible by the one or more processors.

18. The computer program product of claim 16, wherein providing the representation of the current geographic location of the telephone device comprises displaying a map that depicts, at least, the current geographic location of the telephone device on a display.

19. The computer program product of claim 18, wherein the map is displayed on the display with i) information that indicates an identity of the telephone device or the associated user and ii) information that prompts a user who is associated with a computing device that is comprised of the one or more processors to accept the telephone call request.

20. The computer program product of claim 18, wherein the operations further comprise:
- identifying a current geographic location of a computing device comprised of the one or more processors or a user that is associated with the computing device; and
- determining a level of zoom at which to display the map based on a distance between the current geographic location of the telephone device and the current geographic location of the computing device,
- wherein the representation of the current geographic location of the telephone device is provided on the display using the determined level of zoom.

* * * * *